(12) United States Patent
Mitchell

(10) Patent No.: US 6,478,145 B2
(45) Date of Patent: Nov. 12, 2002

(54) EYEGLASSES RETAINER AND CASE WITH DETACHABLE STRAPS

(75) Inventor: Troy E. Mitchell, Santa Monica, CA (US)

(73) Assignee: Suncepts, Inc., Santa Monica, CA (US)

( * ) Notice: Subject to any disclaimer, the term of this patent is extended or adjusted under 35 U.S.C. 154(b) by 0 days.

(21) Appl. No.: 09/738,527

(22) Filed: Dec. 15, 2000

(65) Prior Publication Data

US 2002/0125147 A1 Sep. 12, 2002

(51) Int. Cl.[7] .............................. A45C 11/04; G02C 5/14
(52) U.S. Cl. .............................. 206/5; 351/123; 351/156
(58) Field of Search .................................. 351/123, 156, 351/157; 206/5, 6

(56) References Cited

U.S. PATENT DOCUMENTS

| | | | |
|---|---|---|---|
| 4,953,695 A | * | 9/1990 | Tallman ........................ 206/5 |
| 5,102,216 A | | 4/1992 | Mitchell |
| 5,151,778 A | * | 9/1992 | Conley ....................... 351/156 |
| D336,098 S | | 6/1993 | Evans |
| 5,299,682 A | | 4/1994 | Tatar |
| 5,366,072 A | | 11/1994 | Goldenberg |
| 5,593,024 A | | 1/1997 | Seiler |
| 5,687,837 A | | 11/1997 | Seiler |
| 5,735,393 A | | 4/1998 | Shiue et al. |
| 5,816,464 A | | 10/1998 | Seiler |
| 5,878,443 A | | 3/1999 | Seiler |
| 6,038,706 A | | 3/2000 | Seiler |
| 6,092,897 A | * | 7/2000 | Smerdon, Jr. ............... 351/157 |
| 6,131,209 A | | 10/2000 | Thayer et al. |

* cited by examiner

Primary Examiner—Bryon P. Gehman
(74) Attorney, Agent, or Firm—Bingham McCutchen, LLP; David G. Beck

(57) ABSTRACT

A double rolled stretch fabric protective member is detachably attached to a pair of connection members at each end to form an eyeglasses retainer and case combination with detachable straps. The connection members comprise tubular straps which may receive the stems of eyeglasses therein and held in place on the stems by elastic bands within the ends of the straps. The assembly is then worn around the head or neck as a retainer preventing the eyeglasses from sliding forward or falling off in sports and such. When the eyeglasses are not worn they can be folded and placed within the cavity formed by unrolling the double roll of the case.

2 Claims, 3 Drawing Sheets

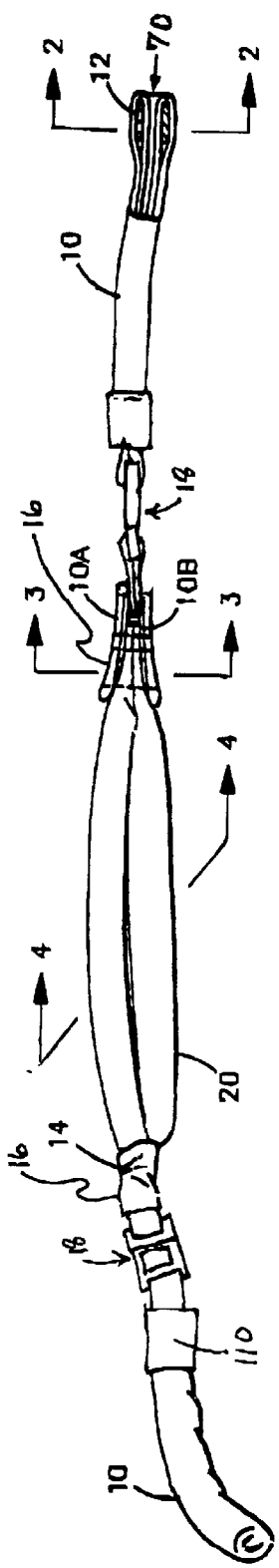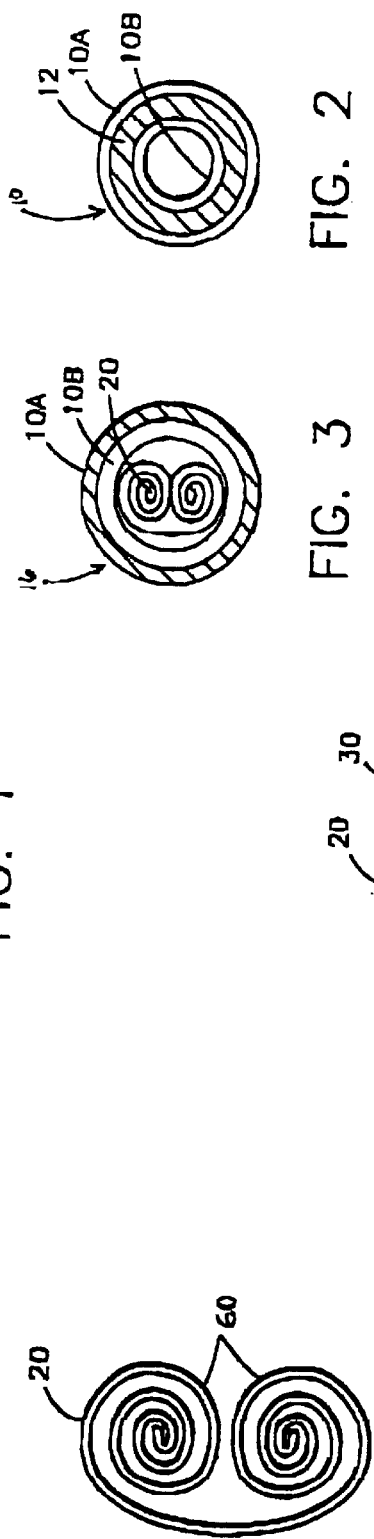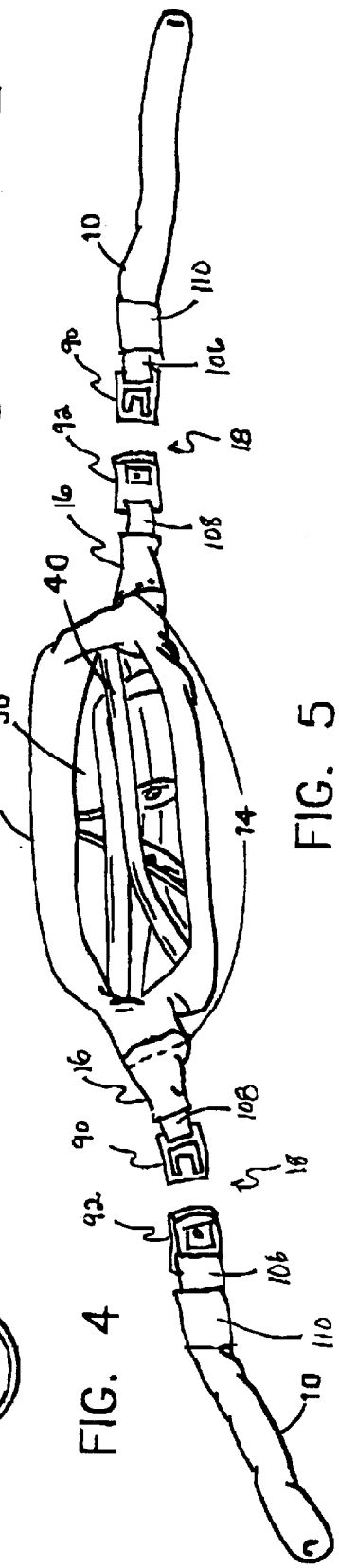

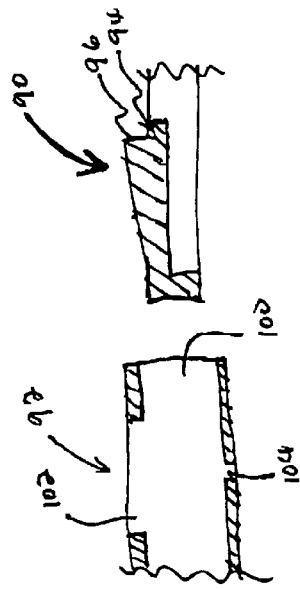
FIG. 8
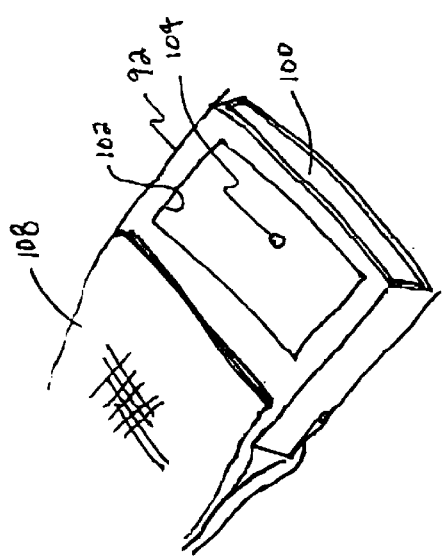
FIG. 7
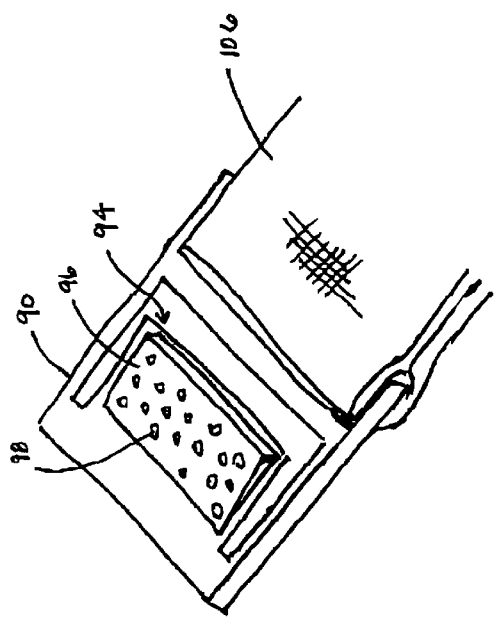

EYEGLASSES RETAINER AND CASE WITH DETACHABLE STRAPS

FIELD OF THE INVENTION

The invention relates to retainers for eyeglasses which fit around the head during the wearing of eyeglasses and which attach to the eyeglasses, and more particularly to such a retainer which can also be used as an eyeglasses case for protecting the eyeglasses when they are not being worn.

BACKGROUND OF THE INVENTION

The prior art teaches several retainers for eyeglasses. U.S. Pat. No. 3,728,012 to Downey discloses a string-like retainer which passes through openings in the eyeglasses stems and is longitudinally adjustable. U.S. Pat. No. 4,133,604 to Fuller shows a headband that serves as a retainer attaching at tubular elements formed as an integral part of the retainer. U.S. Pat. No. 4,541,696 to Winger et al. is a retainer made of knit material and functioning similarly to Fuller. U.S. Pat. No. 4,692,002 to Meistrell comprises a long stretchable band having holes for insertion of the eyeglasses stems for attachment. U.S. Pat. No. 4,696,556 to Perry III is a headband retainer similar to Winger but having an improved end design. U.S. Pat. No. 4,818,094 to Lyons is similar to several prior art designs but includes the improvement of an adjustment ring for elimination of slack in the attachment. None of the prior art disclosures show the combination of features and capabilities of the instant invention. It is the applicants opinion that the combination of features of the instant invention make it quite unique and extremely useful. Other know prior, art includes U.S. Pat. Nos. 5,102,216; D336,098; 5;299,682; 5,366,072; 5,593,024; 5,687,837; 5,735,393; 5,816,464; 5,878,443; 6,038,706; and 6,131,209.

SUMMARY OF THE INVENTION

A combination eyeglasses retainer and eyeglasses protective cover is disclosed comprising a protective case having a connection member detachably attached at each end. The connection member provides for temporarily joining the case to the stems of a pair of eyeglasses. The protective case and the connection member form a linear band for retaining eyeglasses on a wearers head. When not being worn the eyeglasses can be removed from the head and placed within the protective case. In the preferred embodiment, the protective case is a linear double roll of stretch fabric stitched closed at each end where the connection member is attached. At the center of the double roll, the rolled fabric can be temporarily unrolled exposing a cavity into which the eyeglasses can be placed for protective storage. The connection member is a coaxial arrangement of flexible tubes with a short elastic tube captured at the free end. The stem of the eyeglasses fits tightly into the free end and is held by the elastic tube. A snug fit of the invention when used as a retainer around the head is obtained by removing slack through adjustment of the free ends on the eyeglasses stems. The invention can, of course, be used for vision correction eyeglasses, sunglasses, safety glasses and goggles or any other eyewear.

BRIEF DESCRIPTION OF THE DRAWINGS

FIG. 1 is a schematic perspective drawing of an embodiment the invention showing details of construction;

FIG. 2 is a schematic cross section view taken from line 2—2 of FIG. 1 of connection member 10 in accordance with an embodiment of the present invention;

FIG. 3 is a schematic cross section view taken from line 3—3 of FIG. 1 of connection member 10 at its attachment with protection member 20 in accordance with an embodiment of the present invention;

FIG. 4 is a schematic cross section view taken from line 4—4— of FIG. 1 of protection member 20 in accordance with an embodiment of the present invention;

FIG. 5 is a schematic perspective view of the invention in use as an eyeglasses case in accordance with an embodiment of the present invention;

FIG. 7 is a schematic perspective view of a preferred embodiment of a detachable fastener; and FIG. 8 is a cross sectional view of complementary portions of the detachable fastener of FIG. 7.

DETAILED DESCRIPTION

Figure 6:
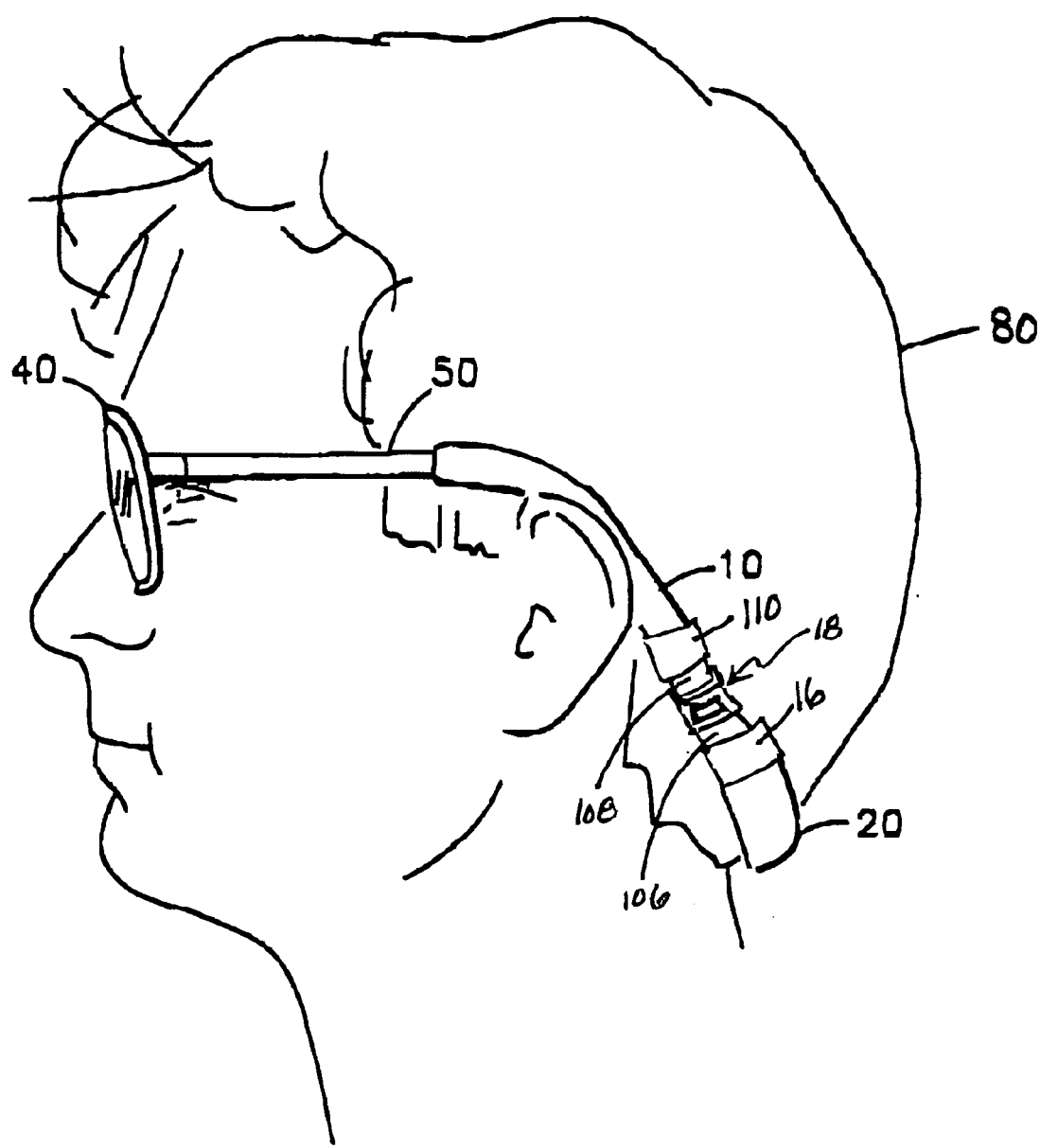
FIG. 6 is a schematic side view of the invention in use as a retainer on a wearer's head in accordance with an embodiment of the present invention.

As shown in FIG. 1, a pair of connection members 10 are detachably attached to opposite ends of a protection member 20. At both of the ends of the protection member, is an end section 16. Both the end sections and the connection members 10 comprise an outer sheath 10A and an inner sheath 10B in coaxial arrangement. Each of the connection members have an elastic tube 12 captured at free end 70.

FIG. 2 shows the cross section of the coaxial arrangement whereby elastic tube 12 is captured between inner and outer sheaths 10A and 10B to form an attachment portion for temporarily joining the connection member to one stem of a pair of the conventional eyeglasses.

One end of protection member 20 is inserted into inner sheath 10B of each end section 16 as shown in FIG. 3 and secured to the end sections by stitching 14.

Connecting the end sections 16 of the protection member to inner ends of the connection members 10 are detachable fasteners 18 which permit detaching (and re-attachment) of the connection members 10 to the protection member 20.

Protection member 20 comprises double roll 60 as shown in FIG. 4. With reference to FIG. 5, in use, protection member 20 is opened by unrolling double roll 60 to expose cavity 30. Eyeglasses 40 are placed in cavity 30 for protection. For use as a retainer, eyeglasses stems 50 are inserted into free ends 70 of connection member 10 and the invention is placed around head 80 as shown in FIG. 6.

In an exemplary embodiment, protective member and connection members may be made from a fabric comprising 90% micro poly fiber and 10% lycra. As another option, protective member may be made from a fabric comprising neoprene or some other buoyant material to help protective member float in water.

In a preferred embodiment, each detachable fastener 18 may comprise a pair of complementary portions 90, 92 that may be detachably attached to each other to permit use of the protective member as a case for eyeglasses separate from the connection members. As best illustrated in FIG. 5, one of the complementary portions of each detachable fastener is coupled to the associated connection member while the other complementary portions of each detachable fastener is coupled to the protection member preferably at the end sections of the protection member. As illustrated in FIG. 5, either complementary portion may be coupled to the protective member or to the connection member.

Turning to FIGS. 7 and 8, complementary portion 90 of each detachable fastener includes a resilient locking tab 94 which may have an outwardly extending triangular wedge portion 96. In one embodiment, an outer face of the wedge portion may include a friction enhancing surface 98.

Complementary portion 92 of each detachably fastener includes a slot 100 adapted for receiving at least a portion of complementary portion 90 and a hole 102 for receiving the locking tab 94 (preferably the wedge portion 96) of the other complementary portion 90 when is inserted into slot 100 to releasably hold the complementary portions 90, 92 together. As an additional option, complementary portion 92 may also include an aperture 104 through a panel opposite hole 102.

In use, to detach the complementary portions 90, 92 from one another, locking tab 94 is deflected inwards by pressing on the outer surface of the wedge portion 98 to position the locking tab out of the hole 102 thereby permitting removable of complementary portion 90 from the slot 100.

In another embodiment, the detachable fasteners may be attached to the associated connect member and the protective member by a pair of elastomeric members 106, 108 to permit flexing and stretching to aid attaching and detaching complementary portions together. In a preferred embodiment, the elastomeric members 106,108 comprise elastic fabric loops that are looped through portions of the associated complementary portion and secured to either the protection member or connection member by end portions 16 or similar tubular end portions 110 respectively and stitching.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. An eyeglasses container and protective case, comprising;
   a protection member formed as a double roll of sheet goods having ends secured by stitching;
   a pair of connection members detachably attached to the protection member on opposite sides thereof, wherein each connection member of said pair of connection members has a tubular shape and is detachably attached to the protection member by a detachable fastener, and wherein each connection member of said pair of connection members has an attachment portion comprising an elastic tube for securing the free end of the connection member to one stem of a pair of eyeglasses;
   whereby the protection member in a first tightly wrapped configuration and the connection member are used jointly to retain the eyeglasses on a wearers head and alternately the protection member in a second, unrolled configuration provides a cavity for the storage of the eyeglasses when not being worn;
   wherein each detachable fastener comprises a pair of detachably attachable complementary portions, a first of the complementary portions being coupled to the associated connection member and a second of the complementary portions being coupled to the protection member.

2. The eyeglasses container and protective case of claim 1, wherein the first complementary portion of each detachable fastener includes a resilient locking tab, wherein the second complementary portion of each detachably fastener includes a slot adapted for receiving at least a portion of the associated first complementary portion and a hole for receiving the locking tab of the associated first complementary portion when the first complementary portion is inserted into the slot of the respective second complementary portion.

\* \* \* \* \*